United States Patent [19]

Nelson et al.

[11] Patent Number: 5,579,204

[45] Date of Patent: Nov. 26, 1996

[54] DISK CARRIER ASSEMBLY

[75] Inventors: Eric C. Nelson, Mendon; Christopher A. Heyden, Belmont; Steven W. Collins; Stephen G. Finnegan, both of Franklin; Christopher M. Thompson, Worcester, all of Mass.

[73] Assignee: EMC Corporation, Hopkinton, Mass.

[21] Appl. No.: 286,775

[22] Filed: Aug. 5, 1994

[51] Int. Cl.$^6$ .................. G06F 1/16; H05K 5/00
[52] U.S. Cl. ............ 361/685; 361/684; 361/686; 361/731; 439/218
[58] Field of Search ................. 361/679, 684, 361/685, 686, 725, 727, 728, 731, 741, 752, 807, 809, 825; 364/708.1; 439/76.1, 76.2, 217, 218; G06F 1/16

[56] References Cited

U.S. PATENT DOCUMENTS

| | | | |
|---|---|---|---|
| 3,723,635 | 3/1973 | Smith | 174/68.5 |
| 4,509,095 | 4/1985 | Boros | 361/386 |
| 4,633,350 | 12/1986 | Hanson | 360/98 |
| 4,669,004 | 5/1987 | Moon et al. | 360/77 |
| 4,695,955 | 9/1987 | Faisandier | 364/413 |
| 4,717,982 | 1/1988 | Toreson et al. | 360/137 |
| 4,783,705 | 11/1988 | Moon et al. | 360/77 |
| 4,800,461 | 1/1989 | Dixon et al. | 361/398 |
| 4,833,554 | 4/1989 | Dalziel et al. | 360/98.04 |
| 4,864,291 | 9/1989 | Korpi | 340/825.5 |
| 4,895,524 | 1/1990 | Thepault | 439/74 |
| 4,907,975 | 3/1990 | Dranchak et al. | 439/67 |
| 4,912,580 | 3/1990 | Hanson | 368/98.01 |
| 4,941,841 | 7/1990 | Darden et al. | 439/377 |
| 4,982,303 | 1/1991 | Krenz | 360/137 |
| 5,009,607 | 4/1991 | Gordon et al. | 439/67 |
| 5,010,426 | 4/1991 | Krenz | 360/97.01 |
| 5,033,049 | 7/1991 | Keener et al. | 371/23 |
| 5,040,997 | 8/1991 | Garner | 439/77 |
| 5,045,960 | 9/1991 | Eding | 360/97.01 |
| 5,077,722 | 12/1991 | Geist et al. | 369/75.1 |
| 5,121,297 | 6/1992 | Haas | 361/398 |
| 5,122,914 | 6/1992 | Hanson | 368/98.01 |
| 5,148,432 | 9/1992 | Gordon et al. | 371/10.1 |
| 5,161,986 | 11/1992 | Gulbranson et al. | 439/92 |
| 5,195,022 | 3/1993 | Hoppal et al. | 361/391 |
| 5,210,855 | 5/1993 | Bartol | 395/500 |
| 5,222,897 | 6/1993 | Collins et al. | 439/157 |
| 5,269,698 | 12/1993 | Singer | 439/157 |
| 5,388,030 | 2/1995 | Gasser et al. | 361/818 |
| 5,398,157 | 3/1995 | Paul | 361/684 |
| 5,463,527 | 10/1995 | Hager et al. | 361/685 |

*Primary Examiner*—Leo P. Picard
*Assistant Examiner*—Lynn D. Hendrickson
*Attorney, Agent, or Firm*—Weingarten, Schurgin, Gagnebin & Hayes

[57] ABSTRACT

A hard disk assembly including a disk drive assembly, and a carrier board is disclosed. The disk drive assembly includes a connector having a form factor corresponding to a particular interface specification, drive control electronics, and a disk drive unit. Additionally, the hard disk assembly may include an adapter to provide a mechanical and electrical interface between the connector associated with the disk drive assembly and a corresponding connector on a midplane of a disk storage subsystem. The disk drive assembly may be disposed in one of at least first and second predetermined locations on the carrier board. The adapter is employed to provide the appropriate mechanical and electrical interface between the connector of the disk drive assembly and the midplane connector of the disk storage subsystem.

26 Claims, 6 Drawing Sheets

5,579,204

DISK CARRIER ASSEMBLY

FIELD OF THE INVENTION

This invention relates to disk storage subsystems and more particularly to disk carrier assemblies for use in disk storage subsystems.

BACKGROUND OF THE INVENTION

A disk storage subsystem generally includes a plurality of hard disk assemblies (HDAs), each of which includes a disk drive assembly which is mounted on a carrier board. The HDA's are disposed in a chassis. The disk drive assembly includes a connector which interfaces with a corresponding connector on a midplane card to make necessary electrical interconnections between the respective disk drive and the midplane card, the disk drive and associated control electronics. The midplane card thus provides an electrical and mechanical interface between the connector on the HDA and other elements of the disk storage subsystem.

The connector of the midplane card is typically provided having a predetermined mechanical form factor and preselected connectors to permit electrical connection therewith. The disk drive units which connect to the midplane card, must therefore have a connector compatible with the mechanical and electrical interface of the midplane card connector.

A problem arises with respect to such disk storage subsystems in that disk drive assemblies may have different form factors and/or electrical connectors for a variety of reasons. More specifically, some standards exist for certain disk drive assemblies, such as disk drives conforming to the SCSI and SCA specifications, however, the form factors for such drives and the associated connectors are not identical. Thus, for example, if the midplane is populated with connectors having a form factor adapted for single connector attachment (SCA) drives, such will be incompatible with single computer system interface (SCSI) drives.

It is desirable to have parts sourced by a number of manufacturers for a variety of reasons. First, if a product is sole sourced and the supplier is unable to provide a device which is needed by a manufacturer, the manufacturer will be unable to produce his products and satisfy customer orders. Additionally, where products are sole sourced, or the number of suppliers are few, and the products are in high demand, there is little motivation for suppliers to offer competitive pricing.

One solution to the problems associated with the limited availability of drives having a specific interface specification is to change connectors on the midplane to adapt such midplane to the connectors associated with a different disk drive. This solution in itself poses other problems. Either selected connectors must be changed leaving the midplane card slot specific in terms of HDA type utilization or alternatively, all connectors must be changed for use with the new disk drive interface. The first alternative is undesirable in terms of sparing and manufacture since all HDA's could not be used in any chassis slot. The second alternative is undesirable as such precludes the use of any existing inventory which has an interface incompatible with the interface of the proposed replacement drives.

It would, therefore, be desirable to provide a disk storage subsystem having a single midplane card which can accept disk drives having different disk drive connectors.

SUMMARY OF THE INVENTION

In accordance with the present invention, a carrier board is provided which is adapted to receive either a disk drive assembly having a connector which is compatible with the midplane card connector or alternatively, a disk drive assembly which is not directly electrically or mechanically compatible with the midplane card connector. The disk drive assembly may be disposed on the carrier board in at least one of first and second predetermined mounting positions. Where the disk drive assembly employs a connector which is compatible with the physical and electrical specifications associated with the midplane card connector, such disk drive assembly is disposed on the carrier board in the first mounting position. When disposed in the first mounting position the disk drive assembly connector can be directly mated with a corresponding midplane card connector.

Where the disk drive assembly employs a connector which is not compatible with the physical and electrical specifications associated with the midplane card connector, however, such disk drive assembly is mounted in the second mounting position and an adapter is employed to couple the respective electrical signals from the connector of the disk drive assembly to the connector of the respective midplane card. With this particular arrangement, HDA's may employ disk drive assemblies having connectors which are incompatible with connectors of midplane card.

For example, the midplane connector may be adapted to couple to a disk drive assembly employing an SCA type interface and connector. Due to issues such as availability or cost, it may in some applications be desirable to employ a disk drive unit having a SCSI interface and connector. In such event, the disk drive assembly having the SCSI interface may be mounted in the second mounting position on the carrier board and the adapter employed to rout the electrical signals from the SCSI connector on the disk drive assembly to the SCA connector on the midplane card.

The disk adapter may include, for example, first and second adapter connectors electrically coupled by a printed circuit board. The printed circuit board can be provided as a rigid-flex printed circuit board which can be coupled to a sled housing adapted to couple to the carrier board on which the disk drive assembly is mountable. The first connector of the disk adapter is coupled to the printed circuit board and is electrically coupled to the second connector of the disk adapter through electrical signal paths disposed on or imbedded in the printed circuit board. The electrical signal paths are provided to minimize impedance discontinuities between the midplane connector and the connector of the non-SCA disk drive assembly. The electrical signal paths on the printed circuit board are also arranged to increase the electrical isolation between the signal paths and to reduce cross talk between the respective paths.

A stud assembly may be employed to couple the disk drive assembly to the carrier board. The stud assembly has no loose hardware which can disengage from the disk drive assembly, thus avoiding the problem of hardware being dropped into the electronics of the disk drive assembly or disk subsystem during assembly or service of the device. Thus, the stud assembly provides a reliable and safe means with which a disk drive assembly can be easily and removably coupled to the carrier board.

BRIEF DESCRIPTION OF THE DRAWINGS

The invention may be more fully understood from the following detailed description in combination with the drawings in which.

DESCRIPTION OF THE PREFERRED EMBODIMENTS

Figure 1:
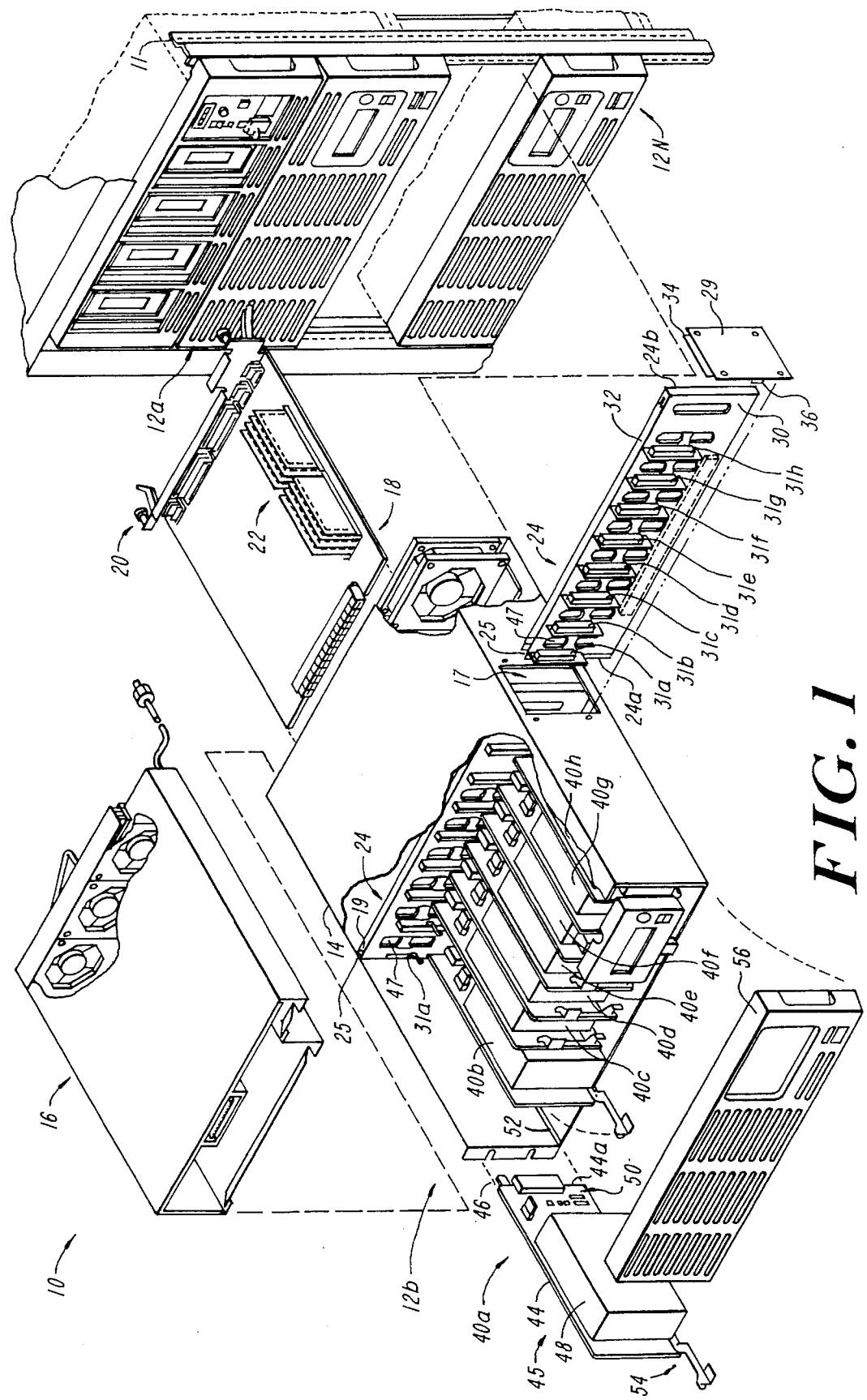
FIG. 1 is a diagrammatical perspective view of a disk storage subsystem including a plurality of hard disk assemblies (HDA's) employing disk drive assemblies employing a non-SCA connector.

Referring now to FIG. 1, a disk storage subsystem 10 includes a rack 11 adapted to receive one or more memory subsystems 12a–12N. Memory subsystem 12b is representative of subsystems 12a–12N. Assembly 12b includes a chassis 14 which receives a cooling module 16 and a controller 18. Controller 18 along with other control electronics has disposed thereon a bulkhead assembly 20 and a cache memory 22.

A midplane card 24 slides into chassis 14 through a side opening 17 as depicted in FIG. 1. In FIG. 1, the midplane card 24 is shown in a first position outside the chassis 14 and in a second position inside the chassis 14. The midplane card 24 is disposed in the second position by sliding the midplane card 24 through the side opening 17 of chassis 14 along a guide provided in the chassis 14.

The midplane card 24 has a first slot 25 formed in a first end 24a thereof. The slot 25 accepts a guide pin 19 which is disposed on the chassis 14 to align the midplane card 24 in a particular location of the chassis 14. After the midplane card 24 is fully inserted into the chassis 14, an access cover 29 closes over the side opening 17 in the chassis 14. The cover 29 makes electrical connection to the midplane card 24 to assure that a grounding connection exists between the chassis 14 and the midplane card 24.

The midplane card 24 includes a printed circuit board 30 having a plurality of midplane connectors 31a–31h electrically and mechanically coupled thereto and projecting from a first surface thereof. The midplane card 24 also has a stiffener 32 coupled to a second surface thereof. The stiffener 32 may for example, be a dielectric material having a conductive nickel coating sprayed thereon. The nickel coating provides electrical continuity between the ground plane of the circuit board 30 and the stiffener 32. Alternatively, the stiffener 32 may be provided from a conductive material such as aluminum. Furthermore, stiffener 32 may be provided by a variety of manufacturing techniques including injection molding techniques, machining techniques or any other manufacturing techniques well known to those of ordinary skill in the art.

After the midplane card 24 is disposed in the chassis 14, the access cover 29 which includes a conductive member 34 and a spring clip assembly 36 are disposed against the second end 24b of the midplane card 24 to thus maintain force against the midplane card 24 and secure the midplane card 24 in the chassis 14.

After the midplane card 24 is secured in the chassis 14, one or more hard disk assemblies (HDAs) 40a–40h generally denoted 40 may be inserted into the chassis 14 through an opening as shown to engage the midplane card 24. HDAs 40 will be described in detail in conjunction with FIGS. 3–5. Each HDA 40 includes a carrier board 44 having an alignment means 46 disposed on a first end 44a thereof, and having a disk drive assembly 45 disposed on a first surface thereof.

Disk drive assembly 45 includes a disk drive unit 48 and associated electronics. The disk drive unit 48 has a disk drive connector which is not compatible with the corresponding midplane connector 31a. Thus a disk adapter 50, disposed on the carrier board 44, provides a mechanical and electrical interface between the connector of the disk drive unit 48 and the midplane card connector 31a.

Taking HDA 40a as representative of HDAs 40b–40h, HDA 40a is disposed in the chassis 14 by sliding the carrier board 44 along a guide 52 disposed on an inside bottom surface of the chassis 14. The alignment means 46 engages an aperture 47 in the midplane card 24 to thus accurately align the HDA 40a with the midplane card 24. In one embodiment, the alignment means 46 may be provided as an alignment tab projecting from the end of carrier board 44.

A locking apparatus 54 provides a cam in action which forces the alignment means 46 into an interference fit with corresponding slots 47 of the midplane card 24. Locking apparatus 54 may be provided as the type similar to apparatus described in U.S. Pat. No. 5,222,897, issued Jun. 29, 1993, assigned to the assignee of the present invention and incorporated herein by reference. The interference fit isolates the carrier board 44 from shock and vibration characteristics to which the midplane card 24 is exposed. After each of the HDAs 40 are disposed in the chassis 14, a cover 56 is disposed over the chassis 14 as shown.

It should be noted that the carrier board 44 and thus the HDA 40a are blindly mated into the midplane connector 31a of the midplane card 24. That is, the carrier board 44 slides into the chassis 14 along the guide 52 and mates with the midplane card connector 31a relying on alignment means 46 to align the HDA 40a with the connector 31a.

It should also be noted that the midplane card 24, and the HDAs 40 are each removable from the chassis 14. Furthermore, as will be described below in conjunction with FIGS. 2–3, the disk drive units 48 and adapter boards 50 are removable from the carrier board 44.

Figure 1A:
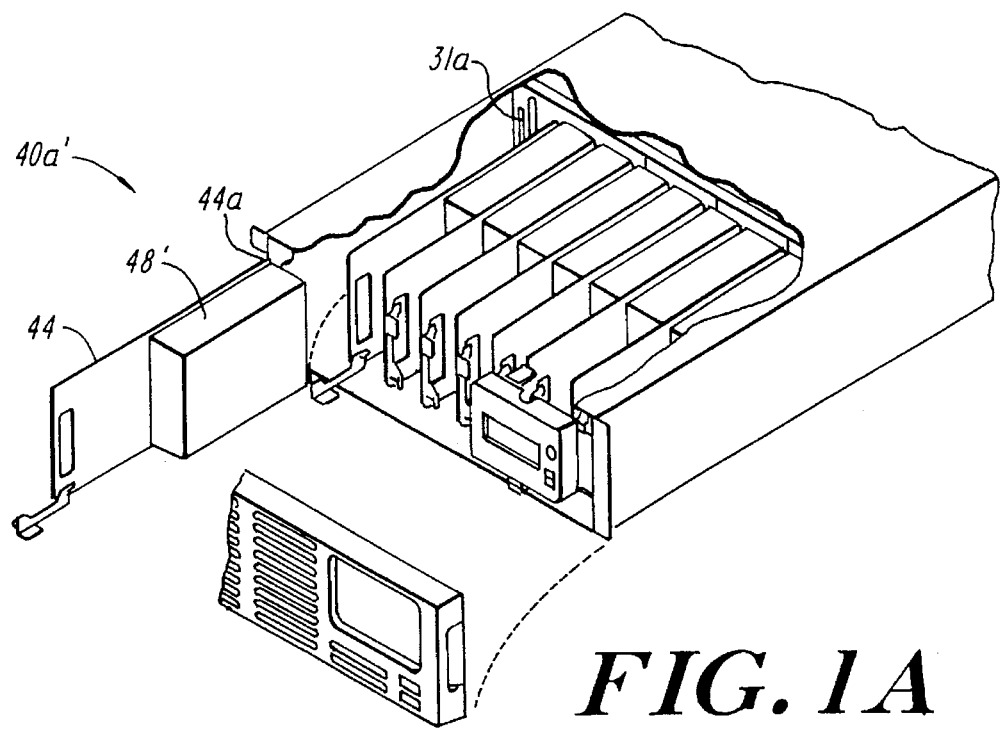
FIG. 1A is a partial diagrammatical perspective view of a disk storage subsystem including a plurality of hard disk assemblies (HDA's) having a disk drive unit with an SCA interface.

Referring now to FIG. 1A, HDA 40a' includes the carrier board 44 described above in conjunction with FIG. 1. HDA 40a' further includes a disk drive unit 48' having a connector which is mechanically and electrically compatible with the midplane connector 31a. Thus, in this application disk adapter 50 (FIG. 1) is employed and disk drive unit 48' is mounted on the carrier board, 44 as shown in FIG. 1A such that the disk drive connector mates with the corresponding midplane card connector 31a.

The carrier board 44 is thus provided having a mounting means which allows a disk drive unit to be mounted in one of first and second predetermined positions. The mounting location for the disk drive unit is selected in accordance with the type of disk drive unit connector which is provided on the disk drive unit and its compatibility with the corresponding midplane card connector.

In the present example where the disk drive unit 48' is compatible with the midplane card connector 31a, the disk drive assembly is mounted in the first mounting location adjacent the first end of the carrier board 44. Alternatively, where the disk drive unit 48 has a connector which is not compatible with the corresponding midplane connector as shown in FIG. 1, then the disk drive assembly is mounted in the second position on the carrier board 44 and the disk adapter 50 is disposed on the carrier board 44 to provide a mechanical electrical interface between the disk drive unit 48 and the corresponding midplane connector.

Figure 2B:
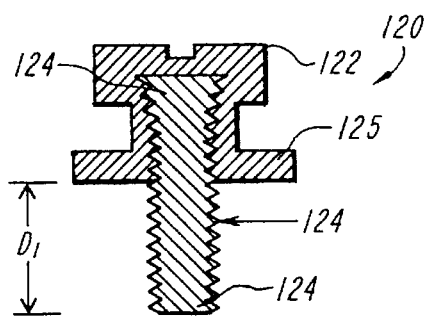
FIG. 2B is a cross sectional view of a stud assembly employed to mount the respective disk drive assembly to the carrier board.
Figure 2:
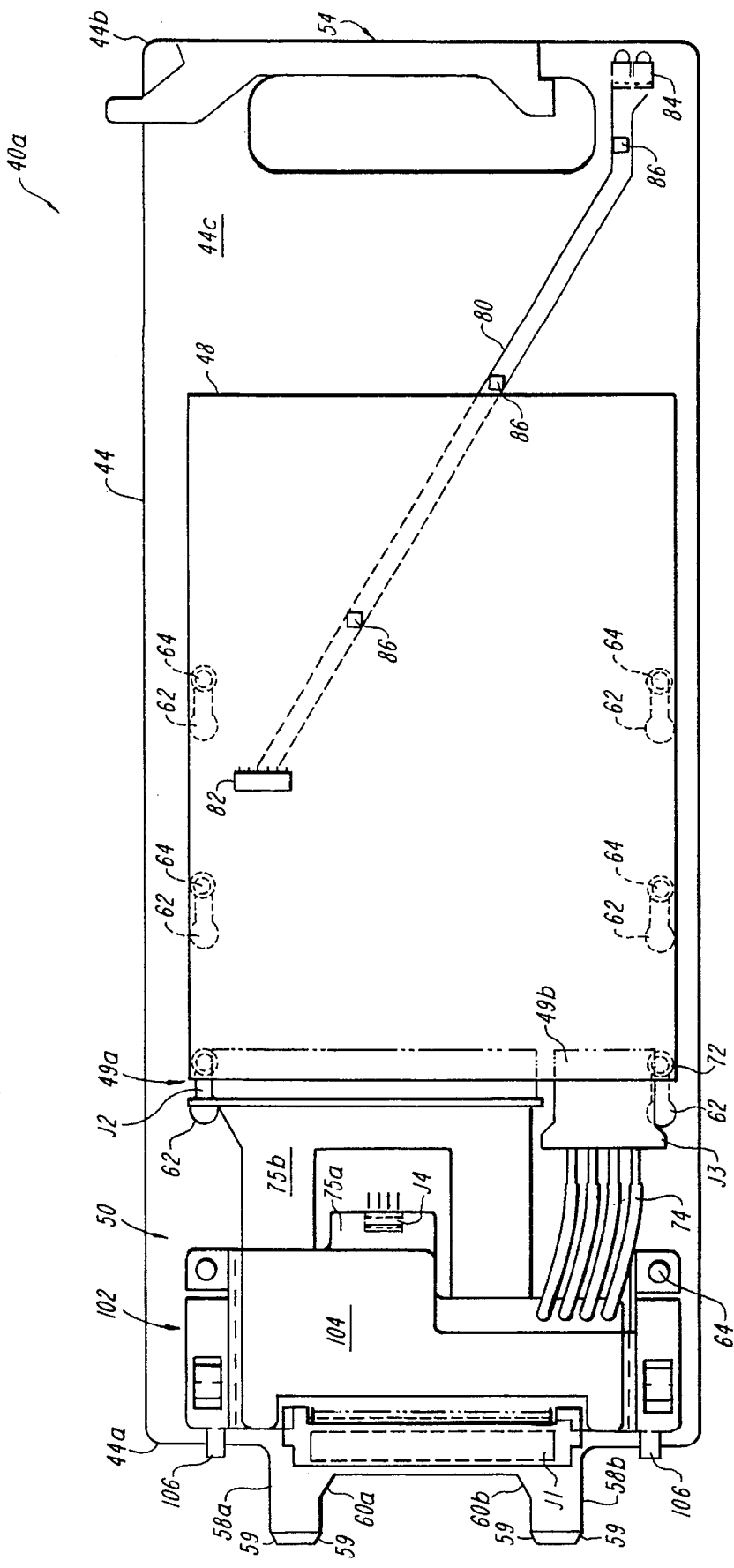
FIG. 2 is a top view of a carrier board having a disk drive assembly with a non-SCA interface disposed thereon.

Referring now to FIGS. 2–2B in which like elements are provided having like reference designations throughout the several views, and again taking HDA 40a as representative of HDA's 40b–40h (FIG. 1), HDA 40a includes the carrier board 44 having first and second ends 44a, 44b and first and second opposing surfaces 44c, 44d.

A pair of alignment tabs 58a, 58b project from the first end 44a of the carrier board 44. Alignment tabs 58a, 58b are each provided having a substantially rectangular shape and having chamfered outer edges 59 and chamfered inner edges 60a, 60b.

The carrier board 44 may be provided from a phenolic resin, a glass epoxy or any other appropriate material well known to those of ordinary skill in the art. As mentioned above, the carrier board 44 is disposed in the chassis 14 (FIG. 1) along the guide 52 (FIG. 1). The alignment tabs 58a, 58b plug into corresponding slots 47 (FIGS. 1 and 1A) in the midplane connector 31a (FIG. 1). The chamfered edges 59 and 60a, 60b of the alignment tabs 58a, 58b facilitate the mating of the HDA 40a with the midplane connector. The locking apparatus 54 provides a cam-in action which forces the alignment tabs 58a, 58b and in particular the chamfered portions 60a, 60b of the alignment tabs 58a, 58b into an interference fit with the slots 47 of the midplane card 24 (FIG. 1). This improves the vibration isolation characteristics of the HDA 40a.

Disposed on the carrier board 44 is the disk drive unit 48. The carrier board 44 is provided having a plurality of slots 62 provided therein. Disposed on a bottom surface 48a of disk drive unit 48 are a plurality of stud assemblies 64. One or more of the stud assemblies 64 may be provided as a captive stud lock assembly as shown in FIG. 2B.

Referring to FIG. 2B, a captive stud lock assembly 120 includes a cap 122 and a threaded stud 124 having a platform 125 locked thereon with a first surface of the platform 125 spaced a predetermined distance D1 from a first end 124a of the stud 124. The cap 122 is disposed over a second end 124b of the stud 124 to form the captive stud lock assembly 120. The second stud end 124b is flared out or widened to prevent the cap 122 from being removed via stud end 122b. The second end of the stud 124b may be widened, for example, by drilling along a central longitudinal axis of the second stud end 122b to flare out the end of the stud 124 such that the cap 122 cannot be backed off the stud 124. Thus the cap 122 is captured on the stud 124.

When the cap 122 is turned in a first direction, the cap 122 screws down securely against the platform 125 as shown in FIG. 2B. When the cap 122 is turned in a second opposite direction, however, the cap 122 moves away from the platform 125. The flared end 124b of the stud 124, however, prevents the cap 122 from being removed from the stud 124.

The cap 122 is provided having recesses in the top thereof to provide a pattern which accepts either Phillips or slotted type screwdrivers. Those of ordinary skill in the art will recognize of course that the cap may be formed to accept other types of screw drivers as well.

The captive stud lock assembly 120 thus has no loose hardware which may be dropped into the electronics of the disk storage system 10 (FIG. 1) and reduces assembly problems associated with the loss of such assembly hardware or the need to dislodge conductive hardware which may inadvertently become lodged in the disk storage system during assembly or maintenance.

Referring again to FIGS. 2 and 2A, the first end of the stud 124a is threaded into the disk drive unit 48 until the platform 125 seats on the surface of the disk drive unit 48 which is to be disposed against the carrier board surface 44c. Thus, the captive stud lock assembly 120 is secured to the disk drive unit 48.

When the disk drive assembly 45 is initially disposed on the carrier board 44, the cap 122 is held in its loosened positioned on the stud 124 and the cap protrudes through the widest portion of the slots 62 in the carrier board 44. The disk drive assembly 45 is then moved into a position such that the caps 122 are aligned over the narrow portion of the slots 62. The cap 122 is then tightened on stud 124 to secure the disk drive assembly 45 to the carrier board 44.

As mentioned above, it should also be noted that the captive stud assembly 120 is a fastener which includes no loose hardware components, thus reducing the likelihood that hardware may be dropped into the electronics of the disk storage system 10 (FIG. 1).

The disk drive unit 48 is disposed on the surface 44c of the carrier board 44 and in the present embodiment is provided having SCSI interface compatible connectors 49a, 49b.

The HDA 40a includes the disk adapter 50 disposed on the first end 44a of the carrier board 44. The disk adapter 50 will be more fully described below in conjunction with FIGS. 4 and 4A. In the present embodiment the disk adapter 50 includes a first connector J1 which is an SCA compatible connector and thus is adapted to couple to the midplane card connector 31a. A second connector J2 is adapted to couple to connector 49a of the disk drive unit 48. In the present embodiment the connector J2 is compatible with the SCSI specifications. A third connector J3 is coupled to the second connector 49b of the disk drive unit 48.

Figure 2A:
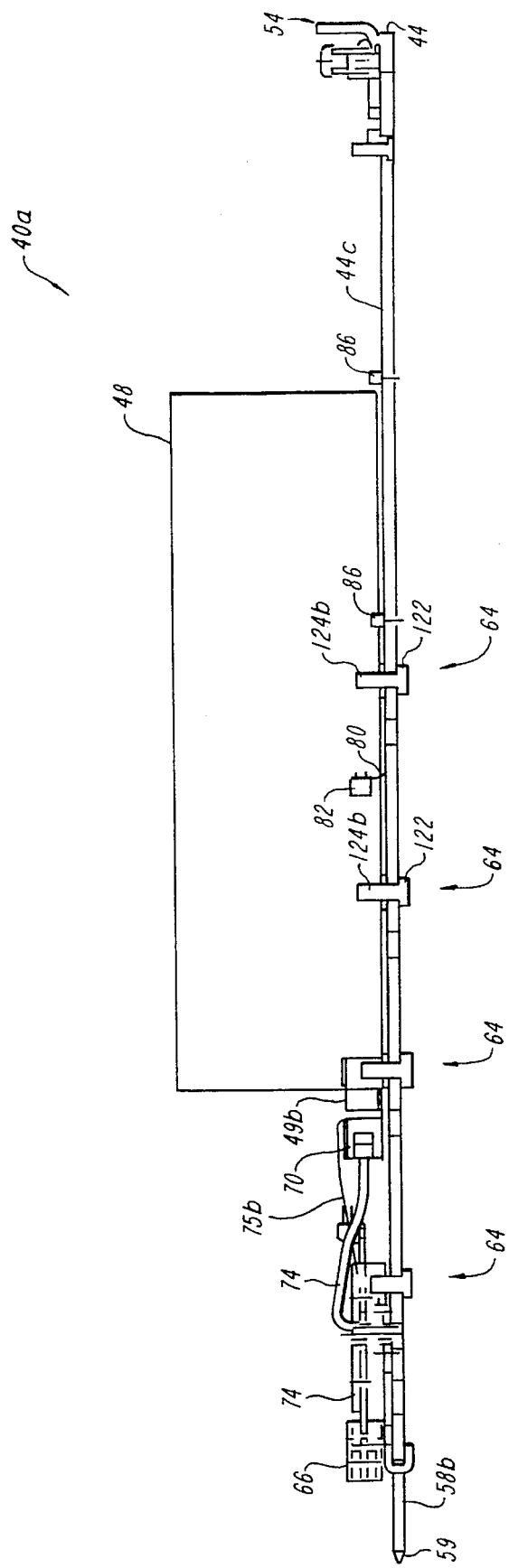
FIG. 2A is a side view of a carrier board having a non-SCA disk drive assembly disposed thereon.

The disk adapter 50 also includes a printed circuit board 75 which includes rigid portion 75a and flex portion 75b. As illustrated in FIG. 2A, the printed circuit board 75 is coupled between the first connector J1 and the second connector J2. The printed circuit board 75 includes a plurality of conductors which electrically connect predetermined pins of connector J1 to predetermined pins of the connectors J2 and J3. The conductors on the printed circuit board 75 are provided having a predetermined width and a predetermined spacing between respective conductors such that signals are electrically isolated and an impedance mismatch is not created between disk drive connector 49 and midplane connector 31a.

A plurality of wires 74a–74d generally denoted 74 couple connector J3 to printed circuit board 75. Thus, each of the connectors 49a, 49b of the disk drive unit 48 are coupled to disk adapter connector J1 which mates with midplane connector 31a.

Connector J2 is a connector compatible with SCSI interface specifications, through which data and control signals are fed while power signals are fed through connector J3. The midplane card connector 31a, in the present embodiment, is compatible with SCA interface specifications in which data control signals and power signals are fed through a single connector housing. Thus, the SCSI connectors 49a, 49b of disk drive unit 48 are incompatible with SCA compatible midplane connector 31a (FIG. 1).

Connector J1, on the other hand, is a so-called SCA connector through which data control and power signals are fed to the midplane card connector 31a. Connector J1 supports 18 bits of data while SCSI connector J2 only supports 9 bits of data. Thus, in this particular application, the upper 9 bits of data supported by the SCA compatible connector J2 are unused.

The disk adapter 50 maps the signals from the connectors J2 and J3 to the appropriate pins of the SCA connector J1. The particular mapping of signals between the pins of the connectors J1, J2 and J3 is shown in the Table below.

TABLE

| Signal Name | J1-SCA | J2-SCSI | J3-Power | J4-Header |
|---|---|---|---|---|
| I/O* | 11 | 50 | | |
| REQ* | 12 | 48 | | |
| C/D* | 46 | 46 | | |
| SEL* | 14 | 44 | | |
| MSG* | 15 | 42 | | |
| RST* | 16 | 40 | | |
| ACK* | 17 | 38 | | |
| BSY* | 18 | 36 | | |
| ATN* | 19 | 32 | | |
| DBFQ (Parity Bit) | 20 | 18 | | |
| DB7 | 21 | 16 | | |
| DB6 | 27 | 14 | | |
| DB5 | 23 | 12 | | |
| DB4 | 24 | 10 | | |
| DB3 | 25 | 8 | | |
| DB2 | 26 | 6 | | |
| DB1 | 27 | 4 | | |
| DB0 | 28 | 2 | | |
| VCC | 34 | | 1 | 1 |
| VCC | 35 | | 1 | |
| VCC | 36 | | 1 | |
| SYNC | 37 | | | 7 |
| GND | 38 | 1–23 odd | 2, 3 | 3, 5, 8 |
| GND | 38 | 27–49 odd | | |
| SCSID0 | 39 | | | 2 |
| SCSID2 | 40 | | | 6 |
| DRV Present | 70 | 20 | | |
| SCSID1 | 79 | | | 4 |
| VDD | 1, 2 | | 4 | |
| VDD | 3, 4 | | | |

It is desirable to maintain the electrical impedance between connectors J1 and J2 such that the characteristics of the signals from the SCSI connector J2 are not altered. The printed circuit board 75 of disk adapter 50 is thus provided having signal lines with pre-selected line widths and line spacings which provide an impedance characteristic between the connectors J1 and J2 such that the SCSI bus impedance specification is not violated.

To ensure that a desired impedance characteristic was achieved, one half-of the pins on the SCSI connector J2 are connected to ground as shown in the Table. In the printed circuit board 75, therefore, a ground signal line is disposed next to each data and control signal line coupled between connector J1 and J2.

The disk adapter 50 is coupled to the carrier board 44 via a sled 102 which will be described in detail below in conjunction with FIG. 5.

Also disposed on the carrier board 44 is a flex assembly 80 having a connector 82 disposed on a first end thereof and an LED 84 coupled to a second end thereof. The flex assembly 80 is firmly coupled to carrier board 44 by one or more tie-downs 86 which are normally used to provide electrical interconnections between circuit components on different layers of the carrier board 44. In the present embodiment, tie-downs 86 are used to securely fasten the flex assembly 80 in place on carrier board 44.

Figure 3:
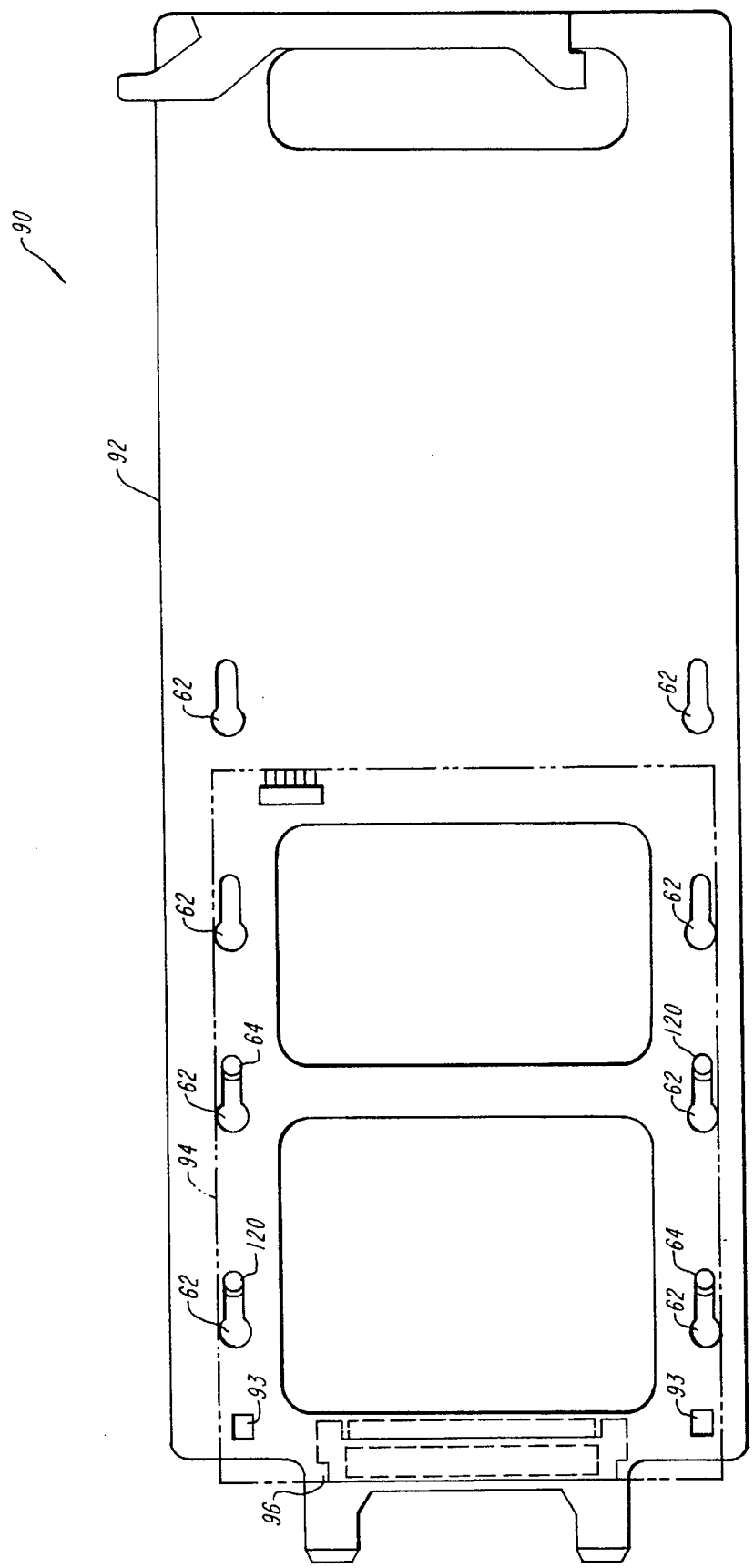
FIG. 3 is a top view of a carrier board having a disk drive assembly with an SCA interface disposed thereon.

Referring now to FIG. 3, an HDA 90 includes a carrier board 92 having disposed thereon a disk drive unit 94 here shown in phantom to allow viewing of other features of the carrier board 92. The carrier board 92 may be similar to the carrier board 44 described above in conjunction with FIGS. 2 and 2A. Disk drive unit 94 includes an SCA compatible disk drive connector 96. Thus, connector 96 is compatible with connector 31a (FIG. 1) of midplane card 24 (FIG. 1).

Since disk drive connector 96 is compatible with the midplane connector 31a, disk drive unit 94 is disposed in the first position at a first end of the carrier 92. Thus, as shown, the studs 64 and the captive stud lock assemblies 120 may be placed in second ones of the plurality of slots 62 and tightened to secure the disk drive unit 94 in the first predetermined position on the carrier 92. Thus carrier 92 allows disk drive units having different types of disk drive connectors to be disposed thereon.

It should be noted that the location of the studs 64 and the captive stud assemblies 120 are selected such that the disk drive unit 94 is held firmly against the carrier board 92 in the HDA 90. As mentioned above, it is preferred that at least one captive stud lock assembly 120 be used, however, those of ordinary skill in the art will recognize that each of the fasteners may be provided as a captive stud lock assembly 120.

Figure 4A:
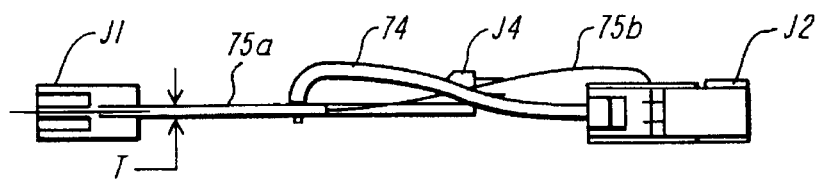
FIG. 4A is a side view of the adapter of FIG. 4.
Figure 4:
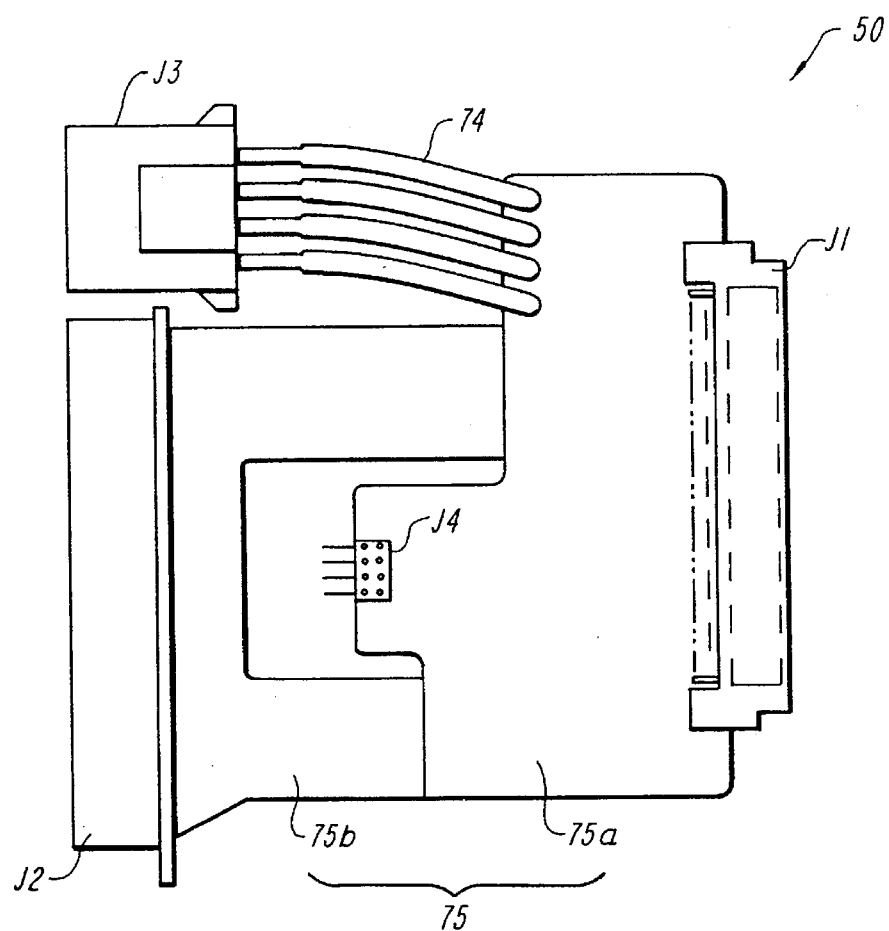
FIG. 4 is a top view of an adapter four coupling the non-SCA interface to the SCA interface of the midplane connector.

Referring now to FIGS. 4 and 4a, in which like elements are provided having like reference designations, the disk adapter 50 is shown to include the first connector J1 coupled to the first rigid portion 75a of the rigid-flex printed circuit board assembly 75. Coupled to the flex portion 75b of the printed circuit board 75 is the second connector J2. Also coupled to the printed circuit board 75 via the wire conductor 74 is the third connector J3.

The rigid portion 75a of printed circuit board 75 is provided having a thickness T typically in the range of about 0.020 inches. Internal conductors of the printed circuit board 75 couple predetermined pins of connector J1 to predetermined pins of connectors J2 and J3 to thus insure a correct electrical interface between the disk drive unit 48 (FIG. 1) and the midplane connector 31 (FIG. 1).

A header connector J4 is also coupled to adapter board 50. Connector J4 is plugs into a corresponding header connector on a disk drive unit. The connector J4 receives identification signals to identify the type of disk drive to which the adapter 50 is coupled. The connector J4 also receives and spindle and synchronization signals from the disk drive unit.

Figure 5:
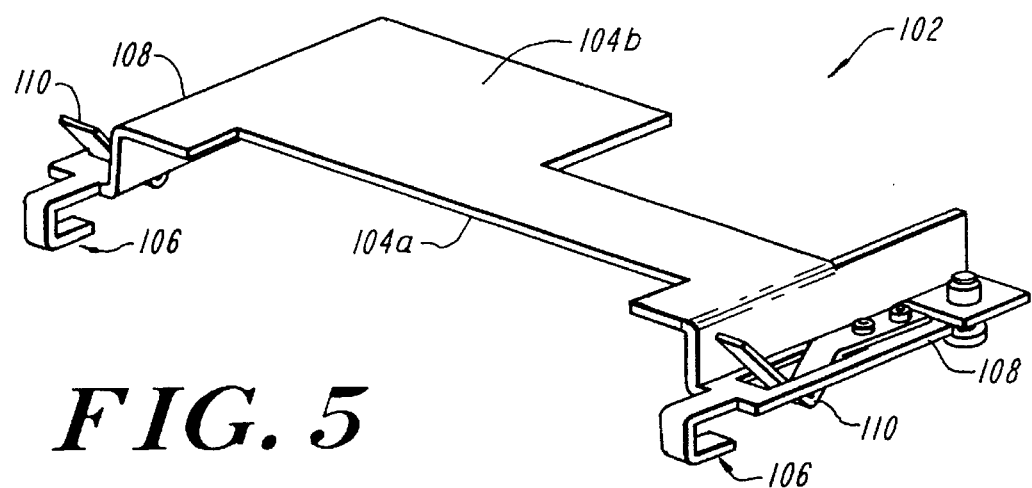
FIG. 5 is a perspective view of a sled housing.

Referring now to FIG. 5, a sled housing 102 has a first substantially planer surface 104a onto which the adapter assembly 50 may be disposed. Sled 102 is coated with a non-conductive material to prevent the sled 102 from contacting any exposed conductors on the printed circuit board 75 which is disposed on the sled 102. Sled housing 102 also includes a pair of hook portions 106. The hook portions 106 provide a means for attaching the sled 102 to the carrier board 44 (FIG. 1). In the present embodiment the sled 102 is formed from sheet metal although such can be fabricated or molded from any suitable material. The hooked portions 106 snap onto the edge of the carrier board 44. When a disk drive unit having a connector incompatible with a midplane card connector is disposed on the carrier board 44, the sled 102 having the disk adapter 50 coupled thereto is attached to the carrier board 44 to allow the disk adapter 50 to provide an electrical and mechanical interface between in the present embodiment the SCSI compatible disk drive connector and the SCA compatible midplane connector.

A pair of sled arms 108 are provided having a pair of apertures therein. Disposed through the apertures are a pair of stainless steel clips 110. Clips 110 are disposed on the sled 102 and are accepted by corresponding holes 93 (FIG. 3) in the carrier board 92 (FIG. 3). The stainless steel clips 110 mate with the holes 93 to thus secure the sled 102 to the carrier board 92 when the sled 102 is attached to the carrier 44 by the fastening means 106.

Having described preferred embodiments of the invention, it will now become apparent to one of skill in the art that other embodiments incorporating the inventive concepts herein disclosed may be employed. Accordingly, these embodiments should be viewed as exemplary and the invention should be limited only by the scope and spirit of the appended claims.

What is claimed is:

1. A storage carrier device for use in a disk storage subsystem having a midplane card and a midplane card connector mounted on said midplane and for carrying one of a first disk drive unit and a second disk drive unit, wherein said first disk drive unit has a first disk drive unit connector which is compatible with said midplane card connector and said second disk drive unit has a second disk drive unit connector which is incompatible with said midplane card connector, said storage carrier device comprising:

a carrier board having a first end and a second end, said carrier board having first and second pluralities of openings defining respective first and second mounting positions for respective first and second disk drive units and wherein said carrier board is adapted to receive one of the first disk drive unit in the first mounting position and the second disk drive unit in the second mounting position and wherein said carrier board has a seated mounting position within said disk storage system in which said first end of said carrier board is adjacent said midplane card connector wherein, when said one of said first and second disk drive units is said first disk drive unit, said first disk drive unit being mountable to said carrier board in said first mounting position to position said first disk drive unit connector so that it is directly mated with and electrically coupled to said midplane card connector when said carrier board is disposed in said seated mounted position; and wherein, when said disk drive unit is said second disk drive unit, said second disk drive unit being mountable to said carrier board in said second mounting position to locate said second disk drive unit connector so that it is spaced from and not directly coupled to said midplane card connector when said carrier board is disposed in said seated mounting position.

2. The storage carrier device of claim 1 further comprising when said disk drive unit is said second disk drive unit, a disk adapter, said disk adapter comprising:

a first adapter connector which is directly mateable to said midplane card connector;

a second adapter connector, which is directly mateable to said second disk drive unit connector and each of said second disk drive unit connector, said first adapter connector, said second adapter connector and said midplane connector having a plurality of electrical contacts within the respective connector;

a plurality of electrical conductors electrically coupling selected ones of said electrical contacts of said first adapter connector to selected ones of said contacts of said second adapter connector to electrically couple said at least one second disk drive unit connector to said midplane connector when said first adapter connector is mated to said midplane card connector and said second adapter connector is mated to said second disk drive unit connector.

3. The storage carrier device of claim 2 wherein said storage carrier device includes said second disk drive unit, said second disk drive unit being mounted in the second mounting position on said carrier board and wherein said second adapter connector is directly mated to said second disk drive unit connector and said first adapter connector is directly mated to said midplane card connector.

4. The storage carrier device of claim 3 wherein said second disk drive unit connector has a first predetermined connector interface and the midplane card connector has a second predetermined connector interface.

5. The storage carrier device of claim 4 wherein disk adapter further includes a printed circuit board and at least selected ones of said plurality of conductors of said disk adapter are provided in the form of electrically conductive paths disposed on said printed circuit board, said printed circuit board having a rigid portion and a flexible portions wherein said at least selected ones of said plurality of conductors have first and second conductor portions and said first conductor portions are disposed on said rigid portion of said printed circuit board and said second conductor portions are disposed on said flexible portion of said printed circuit board.

6. The storage carrier device of claim 2 wherein said disk adapter further comprises:

a sled housing adapted to couple to said carrier board;

a printed circuit board coupled to said sled housing;

wherein at least some of said plurality of conductors comprise conductors disposed on said printed circuit board.

7. The storage carrier device of claim 6 wherein said second disk drive unit connector comprises a first connector of said second disk drive unit and said second disk drive unit has, in addition, a second connector, said disk adapter further comprises:

a third adapter connector adapted to directly mate with the second connector of said second disk drive unit, said third adapter connector having a plurality of electrical contacts; and a plurality of electrical conductors connecting selected ones of said plurality of electrical contacts of said third adapter connector to selected ones of said plurality of electrical contacts of said first adapter connector.

8. The storage carrier device of claim 7 wherein:

said sled housing has a first edge and said sled housing is provided having a slot along said first edge; and a clip having a clip end portion, said clip being mounted to said sled housing along said first edge with said clip end portion projecting through said slot for securing said sled housing to said carrier board;

said carrier board having a first end which is adjacent said midplane connector when one of said first and second disk drive unit connectors is coupled to said midplane connector;

said carrier board having a clip receiving opening along said first end such that said clip end portion extends into said clip receiving opening of said carrier board when said sled is mounted to said carrier board to thereby secure said sled to said carrier board.

9. The storage carrier device of claim 8 wherein said carrier board is provided as a phenolic card.

10. A hard disk assembly for interfacing a disk drive having a disk drive connector interface comprising at least one connector to a midplane card connector, wherein disk drive connector interface in not compatible with said midplane card connector, said hard disk assembly comprising:

a carrier board having a first end and a second end;

a disk drive unit mounted on said carrier board such that said disk drive connector interface is spaced from said midplane card connector;

a disk adapter having at least first and second disk adapter connectors;

said first disk adapter connector being configured to directly mate with said midplane card connector and said second disk adapter connector being configured to mate directly with said at least one connector of said disk drive connector interface, said first and second disk adapter connectors each having a plurality of terminals;

a plurality of electrical conductors connecting predetermined ones of said terminals of said first disk adapter connector to predetermined ones of said terminals of said second disk adapter connector so as to electrically couple said hard disk connector interface to said midplane card connector when said first disk adapter connector is mated with said midplane card connector and said second disk adapter connector is mated with said at least one connector of said disk drive connector interface;

a stud assembly, for securing said disk drive to said carrier board wherein said stud assembly includes:

a stud having first and second portions wherein the first portion mechanically couples to said disk drive, said second portion having a first end which abuts the disk drive when mechanically coupled thereto and a second end spaced a predetermined distance from said first end;

a member secured to the second portion of said stud wherein the member forms a shoulder having a first surface spaced said predetermined distance from said first end of the second portion of said stud; and a cap having a first cap surface opposing said shoulder first surface, said cap being coupled to the second portion of said stud, wherein the end of the second portion of said stud is formed such that said cap cannot be removed therefrom and wherein said cap is adapted to removably secure said disk drive unit to said carrier board by securing said carrier board between said first cap surface and said should first surface.

11. The hard disk assembly of claim 10 wherein said first end of said carrier board includes at least one alignment tab.

12. A hard disk assembly for use in a disk storage subsystem having a backplane and a backplane connector having a first predetermined connector interface mounted on said backplane, said hard disk assembly comprising:

a carrier board having a first end and a second end, and mountable within said disk storage subsystem in a seated mounting position, said carrier board having first and second pluralities of openings defining respectively first and second mounting positions wherein said carrier board includes mounted thereon one of:

(a) a first disk drive unit having a first disk drive unit connector compatible with said backplane connector, said first disk drive being mounted in the first mounting position wherein said first disk drive unit connector is directly mateable with and directly electrically coupleable to said backplane connector mounted on said backplane when said carrier board is mounted in said seated mounting position; and (b) a second disk drive unit having a second disk drive unit connector compatible with a second predetermined connector interface, said second disk drive being mounted in the second mounting position, and further including a disk adapter mounted on said carrier board, said disk adapter electrically coupling said second disk drive unit connector of said second disk drive unit to the backplane connector mounted on said backplane.

13. The hard disk assembly of claim 12 wherein said disk adapter further comprises:

a first disk adapter connector compatible with said first predetermined connector interface and coupleable to said backplane connector mounted on said backplane;

a second disk adapter connector compatible with said second predetermined connector interface coupled to the second disk drive unit connector of the second disk drive unit; and a printed circuit board having a plurality of electrical conductors disposed thereon wherein the conductors of said printed circuit board couple said first disk adapter connector to said second disk adapter connector.

14. A hard disk assembly for use in a disk storage subsystem having a backplane and a backplane connector mounted on said backplane, said hard disk assembly comprising:

a carrier board having a first end and a second end;

a disk drive unit mountable on said carrier board, said disk drive unit having a connector which is mechanically incompatible with said backplane mounted connector;

a disk adapter having at least first and second disk adapter connectors for coupling said disk drive unit connector to the backplane connector, said first and second disk adapter connectors each having a plurality of terminals; and a plurality of disk adapter electrical conductors connecting predetermined ones of said terminals of said first disk adapter connector to predetermined terminals of said second disk adapter connector.

a stud assembly, for mounting said disk drive unit to said carrier board wherein said stud assembly includes:

a stud having first and second portions wherein the first portion mechanically couples to said disk drive unit;

a member secured to the second portion of said stud wherein the member forms a shoulder having a first surface spaced a predetermined distance from an end of the second portion of said stud; and a cap coupled to the second portion of said stud, wherein the end of the second portion of said stud is formed such that said cap cannot be removed therefrom and wherein said cap is adapted to removably secure said disk drive unit to said carrier board by securing said carrier board between the first surface of said member and a first surface of said cap.

15. The hard disk assembly of claim 14 wherein said carrier board has at least one alignment tab at said first end.

16. The hard disk assembly of claim 14 wherein said disk adapter further comprises:

a printed circuit board having a first end and a second end wherein said plurality of disk adapter electrical conductors are disposed on said printed circuit board.

17. The hard disk assembly of claim 16 wherein said printed circuit board has a rigid portion and a flexible portion and said first disk adapter connector is coupled to the rigid portion of said printed circuit board and said second disk adapter connector is coupled to the flexible portion of said printed circuit board.

18. The hard disk assembly of claim 17 wherein said printed circuit board is coupled to a sled which is mountable on said carrier board.

19. A storage carrier device for carrying one of a first disk drive unit and a second disk drive unit and mounting said one of a first and second disk drive units in a disk storage system so as to electrically couple the respective one of said first and second disk drive units to a midplane card connector mounted on a midplane, wherein said first disk drive unit has an interface which is compatible with said midplane card connector and wherein said second disk drive unit has an interface having first and second connectors which interface is incompatible with said midplane card connector, said storage carrier device comprising:

a carrier board having a first end and a second end and a seated mounting position within said disk storage system wherein said first end of said carrier board is adjacent said midplane card connector;

one of said first and second disk drive units;

said carrier board having first and second predetermined mounting positions for respective first and second disk drive units and said one of said first and second disk drive units being mounted in the respective one of said first and second predetermined mounting positions;

in the event said one of said first and second disk drive units comprises said first disk drive unit, said first disk drive unit interface being directly mated with and electrically coupled to said midplane card connector when said carrier board is in said seated mounting position within said disk storage system;

in the event said one of said first and second disk drive units comprises said second disk drive unit, said storage carrier device further comprising a disk adapter coupled to the first end of said carrier board;

a sled housing having a first edge and adapted to couple to said carrier board;

said disk adapter including a printed circuit board having a first end and a second, said printed circuit board coupled to said sled housing and having a plurality of conductors disposed thereon;

a first disk adapter connector having contacts coupled to selected ones of said plurality of conductors on said printed circuit board, said first disk adapter connector being configured to directly couple to the midplane card connector; and a second disk adapter connector having contacts coupled to selected ones of said plurality of conductors on said printed circuit board, said second disk adapter connector being configured to directly couple to the first connector of said second disk drive unit interface;

a third disk adapter connector adapted to couple to the second connector of said second disk drive unit interface; and a plurality of coupling conductors electrically coupling said third connector to said first connector.

wherein said first and second connectors of said second disk drive unit interface are electrically coupled to said midplane card connector when said second disk adapter connector is mated with said first connector of said second disk drive unit interface, said third disk adapter connector is mated with said second connector of said second disk drive unit interface and said first disk adapter connector is mated with said midplane card connector;

said sled housing having at least one slot along said first edge of said sled housing; and a clip, having a clip fastening portion and a clip end portion, said clip fastening portion being fastened to said sled such that said clip end portion protrudes through said slop in said sled housing;

said carrier board having an opening in said board along the first end thereof such that said clip end portion extends into said opening in said carrier board to secure said sled in position with respect to said carrier board.

20. The storage carrier device of claim 19 wherein said carrier board is provided as a phenolic card having at least one alignment tab projecting from the first end of said carrier board.

21. A disk storage carrier device comprising:

one of a first disk drive unit and a second disk drive unit wherein said first disk drive unit has a first disk drive unit connector having a first configuration and said second disk drive unit has at least one second disk drive unit connector having a second configuration which is different from said first configuration of said first disk drive unit connector;

a carrier board having first and second ends, first and second predetermined mounting locations respectively for said first and second disk drive units and a disk adapter mounting location adjacent said first end of said carrier board;

one of said first and second disk drive units being mounted to said carrier board in the respective first or second predetermined mounting location;

when said first disk drive unit is mounted to said carrier board in said first predetermined mounting location, said first disk drive unit connector being located adjacent said first end of said carrier board in a predetermined connector seating location;

when said second disk drive unit is mounted to said carrier board in said second predetermined mounting location, said second disk drive unit connector being spaced from said first end by a predetermined distance; and when said second disk drive unit is mounted to said carrier board in said second predetermined mounting location, said disk storage carrier device further comprising a disk adapter having;

a first disk adapter connector having the same mechanical configuration as said first disk drive unit connector; said first disk adapter connector having a plurality of electrical contacts;

at least one second disk adapter connector having a mechanical configuration adapted to mate with said at least one second disk drive unit connector, each of said at least one second disk adapter connector having a plurality of electrical contacts and said at least one second disk adapter connector being mated with said at least one second disk drive unit connector;

a plurality of conductors electrically coupling selected ones of said plurality of electrical contacts of said at least one second disk adapter connector to selected ones of said electrical contacts of said first disk adapter connector;

said disk adapter being mounted to said carrier board in said disk adapter mounting location such that said first disk adapter connector is positioned in said predetermined connector seating location.

22. The disk storage carrier device of claim 21 wherein said at least one second disk drive unit connector comprises first and second disk drive unit connectors and said at least one second disk adapter connector comprises separate signal and power disk adapter connectors.

23. The disk drive storage carrier device of claim 22 said disk adapter further includes a printed circuit board and wherein said plurality of conductors are disposed on said printed circuit board, said printed circuit board having a rigid portion and a flexible portion, selected ones of said plurality of conductors having a first conductor portion and a second conductor portion, said first conductor portions of said selected ones of said plurality of conductors being disposed on said flexible portion of said printed circuit board and said second conductor portions or said selected ones of said plurality of conductors being located on said rigid portion of said printed circuit board.

24. The disk drive storage carrier device of claim 23 wherein said first conductor portions couple to said signal disk adapter connector and said second conductor portions couple to said first disk adapter connector.

25. The disk drive storage carrier of claim 21 wherein said one of said first disk drive unit and a second disk drive unit is mounted to said carrier board with a stud assembly, said stud assembly comprising:
 a stud having first and second portions wherein the first portion mechanically couples to said disk drive unit;
 a member secured to the second portion of said stud wherein the member forms a shoulder having a first surface spaced a predetermined distance from an end of the second portion of said stud; and
 a cap coupled to the second portion of said stud, wherein the end of the second portion of said stud is formed such that said cap cannot be removed therefrom and wherein said cap is adapted to removably secure said disk drive unit to said carrier board by securing said carrier board between the first surface of said member and a first surface of said cap.

26. A disk storage carrier for mounting a selected one of a first disk drive unit and a second disk drive unit wherein said first disk drive unit has a first disk drive unit connector and said second disk drive unit has at least one second disk drive unit connector with a different mechanical configuration from first disk drive unit connector, said disk storage carrier comprising:
 a carrier board having first and second ends and having first and second predetermined mounting locations respectively for said first and second disk drive units and a disk adapter mounting location adjacent said first end of said carrier board;
 said first disk drive unit being mountable to said carrier board in said first predetermined mounting location so as to position said first disk drive unit connector adjacent said first end of said carrier board in a predetermined connector seating location;
 said second disk drive unit being mountable to said carrier board in said second predetermined mounting location so as to position said second disk drive unit connector a predetermined distance from said first end of said carrier board; and
 for use in conjunction with said second disk drive unit, a disk adapter having;
   a first disk adapter connector having the same mechanical configuration as said first disk drive unit connector; said first disk adapter connector having a plurality of electrical contacts;
   at least one second disk adapter connector having a mechanical configuration adapted to mate with said at least one second disk drive unit connector, each of said at least one second disk adapter connector having a plurality of electrical contacts and each of said at least one second disk adapter connector being mateable with each of said at least one second disk drive unit connector;
   a plurality of conductors electrically coupling selected ones of said plurality of electrical contacts of said at least one second disk adapter connector to selected ones of said electrical contacts of said first disk adapter connector;
   said disk adapter being mountable to said carrier board is said disk adapter mounting location such that said first disk adapter connector is positioned in said predetermined connector seating location.

\* \* \* \* \*